(12) United States Patent
Murai et al.

(10) Patent No.: US 11,662,000 B2
(45) Date of Patent: May 30, 2023

(54) CHAIN GUIDE

(71) Applicant: TSUBAKIMOTO CHAIN CO., Osaka (JP)

(72) Inventors: Kosuke Murai, Osaka (JP); Masanori Watanabe, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 17/519,708

(22) Filed: Nov. 5, 2021

(65) Prior Publication Data
US 2022/0221030 A1 Jul. 14, 2022

(30) Foreign Application Priority Data

Jan. 12, 2021 (JP) .............................. JP2021-002836

(51) Int. Cl.
*F16H 7/08* (2006.01)
*F16H 7/18* (2006.01)
*F16H 7/06* (2006.01)

(52) U.S. Cl.
CPC ................ *F16H 7/08* (2013.01); *F16H 7/18* (2013.01); *F16H 7/06* (2013.01); *F16H 2007/0872* (2013.01); *F16H 2007/185* (2013.01)

(58) Field of Classification Search
CPC ...... F16H 7/06; F16H 7/08; F16H 2007/0863; F16H 2007/0872; F16H 7/18; F16H 2007/185; F16H 2007/0893; F16H 2007/0842; F16H 2007/0844; F02B 67/06; F01L 1/022
See application file for complete search history.

(56) References Cited

U.S. PATENT DOCUMENTS

| 4,832,664 | A | * | 5/1989 | Groger | .................... | F01L 1/022 |
| | | | | | | 474/140 |
| 6,120,403 | A | | 9/2000 | Suzuki et al. | | |
| 6,312,353 | B1 | * | 11/2001 | Oba | ......................... | F16H 7/18 |
| | | | | | | 474/140 |
| 6,322,471 | B1 | * | 11/2001 | Hashimoto | ............... | F16H 7/18 |
| | | | | | | 474/140 |

(Continued)

FOREIGN PATENT DOCUMENTS

| GB | 2539970 A | * | 1/2017 | ............... F16H 7/06 |
| JP | H10-238604 A | | 9/1998 | |

(Continued)

*Primary Examiner* — Michael R Mansen
*Assistant Examiner* — Raveen J Dias
(74) *Attorney, Agent, or Firm* — WHDA, LLP

(57) ABSTRACT

A chain guide is provided that can improve the work efficiency during assembly and transportability with a simple structure. The chain guide includes a bushing structure where a bushing member is attached to a guide body at least in one location. The guide body includes a cylindrical insertion hole through which a bushing cylindrical part is inserted, and a backside restricting part that restricts movement of a flange part to the back side in the guide width direction. The guide body is provided, in each bushing structure, with a front-side restricting portion that restricts movement of the flange part to the front side in the guide width direction only in one location on the outer circumference of the cylindrical insertion hole when viewed in the guide width direction.

8 Claims, 9 Drawing Sheets

(56) References Cited

U.S. PATENT DOCUMENTS

| | | | | |
|---|---|---|---|---|
| 6,524,202 B1* | 2/2003 | Tada | ............... | F16H 7/08 |
| | | | | 474/140 |
| 6,585,614 B1* | 7/2003 | Kumakura | ............... | F16H 7/18 |
| | | | | 474/140 |
| 6,601,473 B2* | 8/2003 | Suzuki | ............... | G05G 1/10 |
| | | | | 74/587 |
| 7,540,817 B2* | 6/2009 | Hashimoto | ............... | F16H 7/0848 |
| | | | | 192/81 C |
| 8,172,709 B2* | 5/2012 | Bodensteiner | ............... | F16H 7/18 |
| | | | | 474/140 |
| 8,308,588 B2* | 11/2012 | Hewitt | ............... | F16H 7/18 |
| | | | | 474/111 |
| 8,393,986 B2* | 3/2013 | Young | ............... | F16H 7/20 |
| | | | | 474/101 |
| 8,430,773 B2* | 4/2013 | Botez | ............... | F16H 7/18 |
| | | | | 474/111 |
| 8,858,375 B2* | 10/2014 | Young | ............... | F16H 7/20 |
| | | | | 474/101 |
| 8,926,461 B2* | 1/2015 | Fuhrmann | ............... | F16H 7/18 |
| | | | | 474/111 |
| 9,297,406 B2* | 3/2016 | Young | ............... | F16H 7/20 |
| 9,777,809 B2* | 10/2017 | Hirayama | ............... | F16H 7/18 |
| 9,989,130 B2* | 6/2018 | Gomes | ............... | F16H 7/18 |
| 9,989,131 B2* | 6/2018 | Matsushita | ............... | F16H 7/18 |
| 2006/0054121 A1* | 3/2006 | Koch | ............... | F16H 7/18 |
| | | | | 123/90.17 |
| 2008/0242460 A1* | 10/2008 | Hewitt | ............... | F16H 7/18 |
| | | | | 474/111 |
| 2009/0197724 A1* | 8/2009 | Young | ............... | F16B 39/32 |
| | | | | 474/133 |
| 2010/0062887 A1* | 3/2010 | Bodensteiner | ............... | F16H 7/08 |
| | | | | 474/111 |
| 2010/0273590 A1* | 10/2010 | Hewitt | ............... | F16H 7/18 |
| | | | | 474/111 |
| 2010/0292037 A1* | 11/2010 | Botez | ............... | F16H 7/18 |
| | | | | 474/111 |
| 2011/0105259 A1* | 5/2011 | Fuhrmann | ............... | F16H 7/18 |
| | | | | 474/140 |
| 2011/0152022 A1 | 6/2011 | Yoshimoto et al. | | |
| 2011/0218068 A1* | 9/2011 | Shimosaka | ............... | F16H 7/18 |
| | | | | 474/140 |
| 2013/0190115 A1* | 7/2013 | Young | ............... | F16H 7/10 |
| | | | | 474/101 |
| 2014/0342861 A1* | 11/2014 | Shimosaka | ............... | F16H 7/18 |
| | | | | 474/111 |
| 2015/0023756 A1* | 1/2015 | Young | ............... | F16B 39/32 |
| | | | | 411/143 |
| 2017/0114873 A1* | 4/2017 | Hirayama | ............... | F16H 7/18 |
| 2017/0114874 A1 | 4/2017 | Matsushita et al. | | |
| 2017/0321786 A1* | 11/2017 | Gomes | ............... | F16H 7/18 |
| 2021/0364066 A1* | 11/2021 | Kanosue | ............... | F16B 17/004 |
| 2022/0228649 A1* | 7/2022 | Nyga | ............... | F16H 7/06 |

FOREIGN PATENT DOCUMENTS

| | | |
|---|---|---|
| JP | 2011-127741 A | 6/2011 |
| JP | 2017-078486 A | 4/2017 |
| WO | WO-2014183752 A1 * 11/2014 | ............... F16H 7/08 |

* cited by examiner

CHAIN GUIDE

BACKGROUND OF THE INVENTION

1. Field of the Invention

The present invention relates to a chain guide that slidably guides a running chain in, for instance, a timing system of an engine.

2. Description of the Related Art

A chain guide that slidably guides a running chain is commonly used in, for instance, a timing system of an engine to stabilize the chain running between sprockets and keep tension thereof appropriately.

Such a chain guide is attached to a mounting target such as an engine block, with a mounting bolt passed through a bolt passage hole formed in a guide body (see, for example, Japanese Patent Application Publications Nos. 2017-078486, 2011-127741, and H10-238604). Since the mounting bolt is made of metal while the guide body is made of resin, the difference in thermal shrinkage occurs between the synthetic resin guide body and the metal mounting bolt due to the heat of the running engine, and looseness is brought about between the bolt passage hole and the mounting bolt, and this eventually, because of the difference in thermal shrinkage, leads to an unstable mounting state of the chain guide.

Hence, conventionally a metal bushing member is interposed inside the bolt passage hole of the guide body for a purpose of alleviating this problem of looseness in the mounted state of the chain guide resulting from the thermal shrinkage difference.

SUMMARY OF THE INVENTION

However, when attaching such a chain guide to the engine block or the like, it is necessary to fasten a mounting bolt, which has passed through the bushing member, to the engine block or the like, while keeping the bushing member inside the bolt passage hole of the guide body. One problem of this is a reduced assembling efficiency and possibility of accidental drop of the bushing member during the transportation of the chain guide.

The present invention is for solving these problems, its object being to provide a chain guide that can improve work efficiency during assembly and transportability with a simple structure.

The present invention achieves the above object by providing a chain guide including: a guide body having a shoe support that supports a guide shoe slidably guiding a running chain on an upper side in a guide height direction; and a bushing structure at least in one location where a bushing member is attached to the guide body. The bushing member includes a bushing cylindrical part formed with a bolt passage hole, and a flange part extending radially outward from the bushing cylindrical part at one end of the bushing cylindrical part. The guide body includes a cylindrical insertion hole formed to extend therethrough in a guide width direction so that the bushing cylindrical part is inserted from a front side to a back side in the guide width direction, and a backside restricting part that restricts movement of the flange part toward the back side in the guide width direction. The guide body includes, in each bushing structure, a front-side restricting portion that is positioned on the front side in the guide width direction of the flange part and restricts movement of the flange part to the front side in the guide width direction only in one location on an outer circumference of the cylindrical insertion hole when viewed in the guide width direction.

According to one aspect of the present invention, the guide body includes a cylindrical insertion hole formed to extend therethrough in a guide width direction so that the bushing cylindrical part is inserted from a front side to a back side in the guide width direction, and a backside restricting part that restricts movement of the flange part to the back side in the guide width direction. The guide body includes, in each bushing structure, a front-side restricting portion that is positioned on the front side in the guide width direction of the flange part and restricts movement of the flange part to the front side in the guide width direction only in one location on an outer circumference of the cylindrical insertion hole when viewed in the guide width direction. Accidental drop of the bushing member from the guide body can thus be prevented, so that the transportability of the chain guide will be improved, as well as the work efficiency when assembling the chain guide to a mounting target such as an engine block can be increased. The front-side restricting portion is provided only in one location for each bushing structure, so that the bushing member can be mounted to the guide body easily.

According to another aspect of the present invention, the guide body includes an extended part extending from the back side to the front side in the guide width direction, and a distal end on the front side of the extended part is formed with the front-side restricting portion. This imparts flexibility to the extended part, and allows for easy attachment of the bushing member to the guide body.

According to another aspect of the present invention, the front-side restricting portion is positioned below the cylindrical insertion hole in the guide height direction. Since the front-side restricting portion is formed on the side away from the shoe support where there are design limitations, this ensures a certain degree of design freedom for the peripheral structure of the front-side restricting portion.

According to another aspect of the present invention, the extended part that has the front-side restricting portion at the distal end on the front side is formed to extend from a backside boss on the back side in the guide width direction of the support wall toward the front side in the guide width direction. This way, the extended part can have a sufficient length in the guide width direction and be readily given good flexibility, so that the bushing member can be easily attached to the guide body.

According to another aspect of the present invention, at the distal end on the front side of the extended part is formed with the front-side restricting portion in a protruded shape so as to protrude toward the center of the cylindrical insertion hole. The guide body includes a guide through hole extending therethrough in the guide width direction at a position coinciding with the front-side restricting portion when viewed in the guide width direction. This guide through hole can serve as an oil passage for letting oil travel between the front side and the back side in the guide width direction, so that oil can be distributed favorably in the bushing structure, in particular in the gap between the cylindrical insertion hole of the guide body and the bushing cylindrical part, and to the extended part having the front-side restricting portion. Moreover, the guide through hole facilitates demolding of the injection-molded synthetic resin guide body, i.e., the guide through hole can be used as a section for setting the mold that forms the back side in the guide width direction of the front-side restricting portion in the protruded form.

Therefore, the front-side restricting portion in the protruded shape can be formed easily and favorably, which in turn can improve the flexibility of the extended part.

According to another aspect of the present invention, the flange part includes a flange restricted portion where the flange part is restricted by the front-side restricting portion from moving to the front side in the guide width direction, and a flange small radius portion that is smaller than the flange restricted portion in terms of radius thereof from a center of the bushing cylindrical part to an outer edge of the flange part.

When attaching the bushing member to the guide body, after the front-side restricting portion has been matched in circumferential position with the flange small radius portion and the bushing cylindrical part has been inserted into the cylindrical insertion hole of the guide body, the bushing member is rotated to bring the front-side restricting portion to a matching circumferential position of the flange restricted portion, so that the front-side restricting portion restricts movement of the flange part toward the front side in the guide width direction. This way, interference between the flange part and the front-side restricting portion when attaching the bushing member to the guide body can be avoided, so that the extended part need not have flexibility, i.e., the degree of design freedom for the extended part and front-side restricting portion can be increased.

According to another aspect of the present invention, the guide body includes a rotation restricting part that restricts rotation of the flange portion in a state in which the front-side restricting portion restricts movement of the flange restricted portion to the front side in the guide width direction. This can prevent accidental drop of the bushing member resulting from accidental rotation of the bushing member after the bushing member has been attached to the guide body.

According to another aspect of the present invention, the reinforcing rib of the guide body includes a peripheral rib formed to surround the outer circumference of the flange part, with the bushing member being attached to the guide body. The reinforcing rib including the peripheral rib not only strengthens the guide body but also prevents a tool or the like from hitting the flange part of the bushing member attached to the guide body and therefore can prevent accidental drop of the bushing member from the guide body.

DESCRIPTION OF THE PREFERRED EMBODIMENTS

A chain guide 10 according to a first embodiment of the present invention will be hereinafter described with reference to the drawings.

Figure 1:
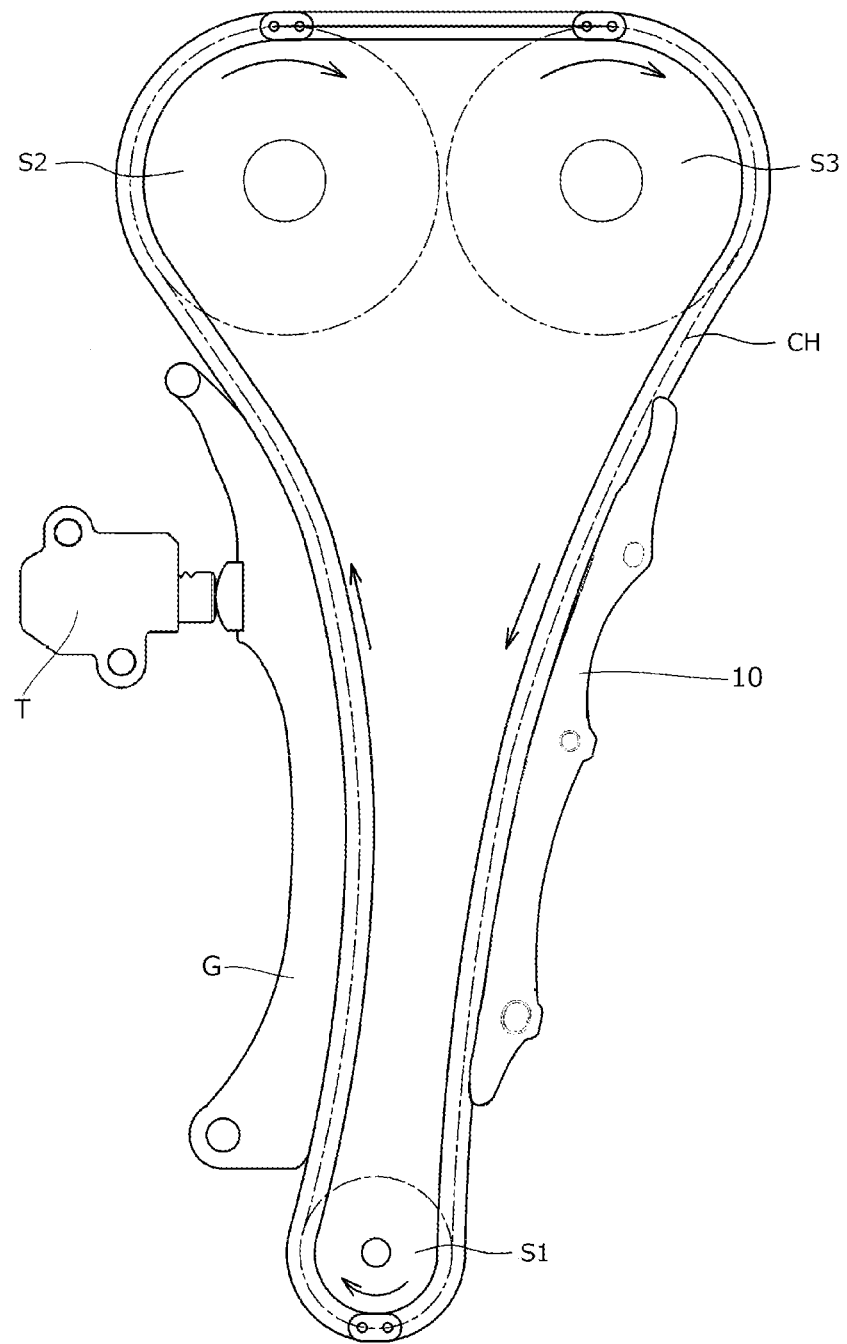
FIG. 1 is an illustrative diagram showing one mode of use of a chain guide according to a first embodiment of the present invention.
Figure 8:
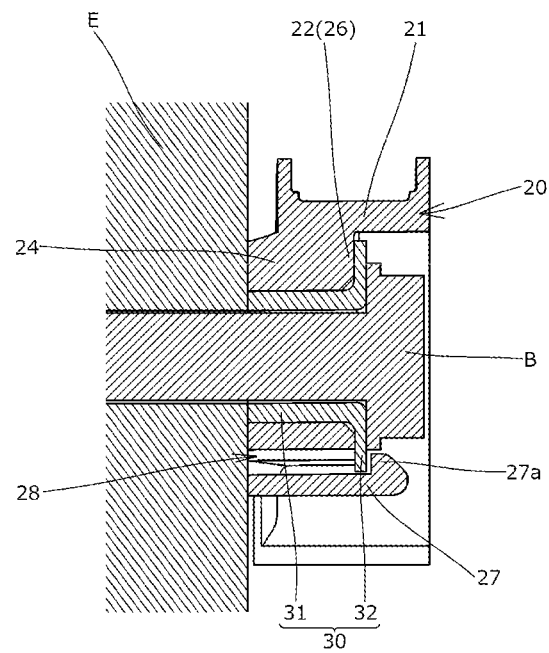
FIG. 8 is a cross-sectional view illustrating a state where the chain guide is attached to a mounting target.

The chain guide 10 according to the first embodiment of the present invention is incorporated in a timing system set inside an engine room, fixedly attached to an engine block E that is the mounting target with a mounting bolt B, to slidably guide a chain CH that runs between sprockets S1 to S3 respectively provided to a crank shaft and cam shafts, as illustrated in FIG. 1 and FIG. 8. In the timing system shown in FIG. 1, a pivotable guide G axially supported such as to be pivotable inside the engine room and pressed by a tensioner T against the chain CH is installed in addition to the chain guide 10 as a guide that slidably guides the running chain CH.

Figure 2:
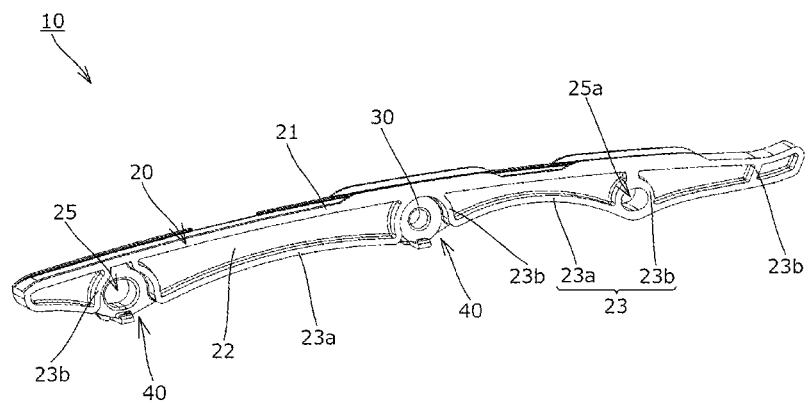
FIG. 2 is a perspective view illustrating the chain guide.
Figure 3:
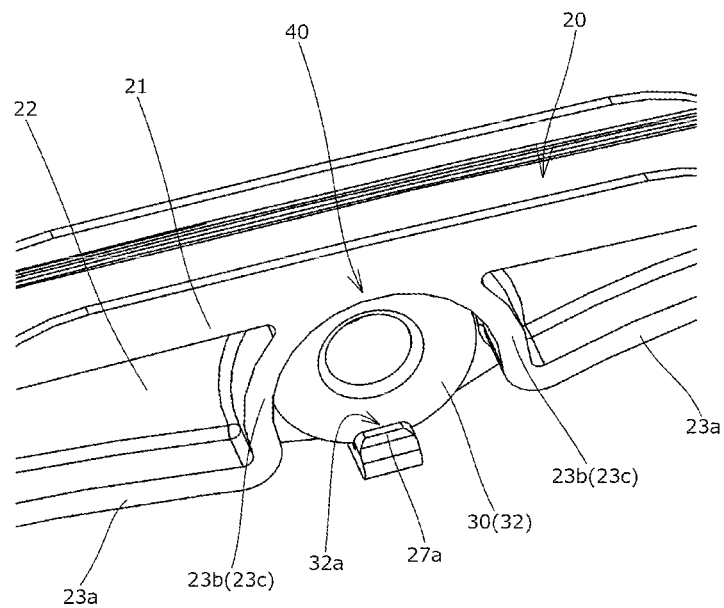
FIG. 3 is an illustrative diagram showing the vicinity of a bushing structure where a bushing member is attached.

The chain guide 10 includes, as illustrated in FIG. 2 and FIG. 3, a guide body 20 that is fixed to the engine block E and includes a shoe support 21 supporting a guide shoe (not shown) that slidably guides the running chain CH above in a guide height direction, and a bushing structure 40 at least in one location (two locations in this embodiment) where a bushing member 30 is attached to the guide body 20.

Figure 4:
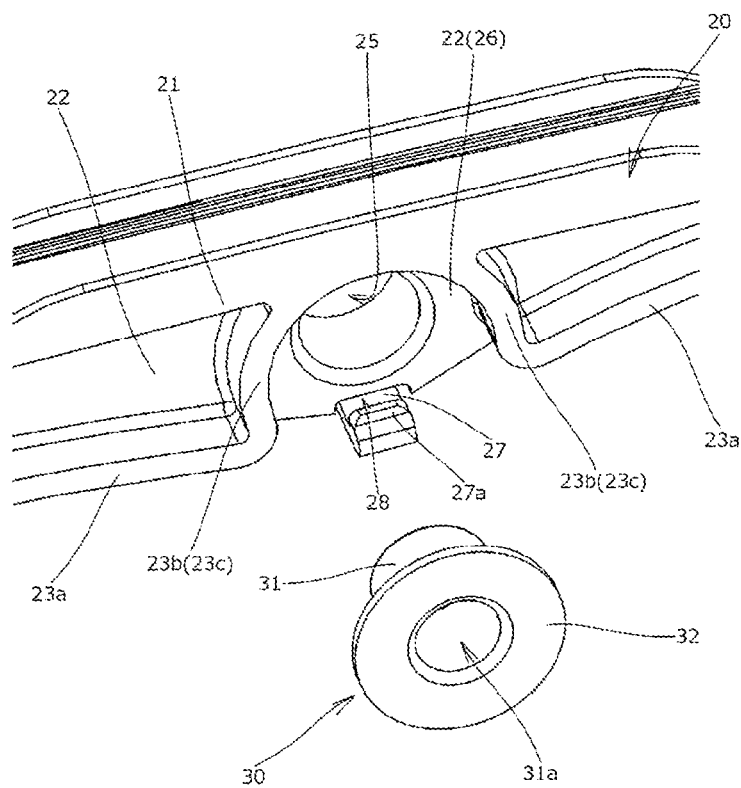
FIG. 4 is an illustrative diagram showing the bushing member separately.

The guide body 20 is made of a synthetic resin or the like by an injection molding technique or the like and includes, as illustrated in FIG. 2 to FIG. 4, the shoe support 21 that supports the guide shoe (not shown), a support wall 22 that supports the shoe support 21 from below, reinforcing ribs 23 protruding from side faces of the support wall 22 in a guide width direction, a backside boss 24 formed on the back side in the guide width direction of the support wall 22, a cylindrical insertion hole 25 extending through in the guide width direction for a bushing cylindrical part 31 of the bushing member 30 to be inserted from the front side to the back side in the guide width direction, a backside restricting part 26, an extended part 27 having a front-side restricting portion 27a, and a guide through hole 28 extending through in the guide width direction.

Figure 7:
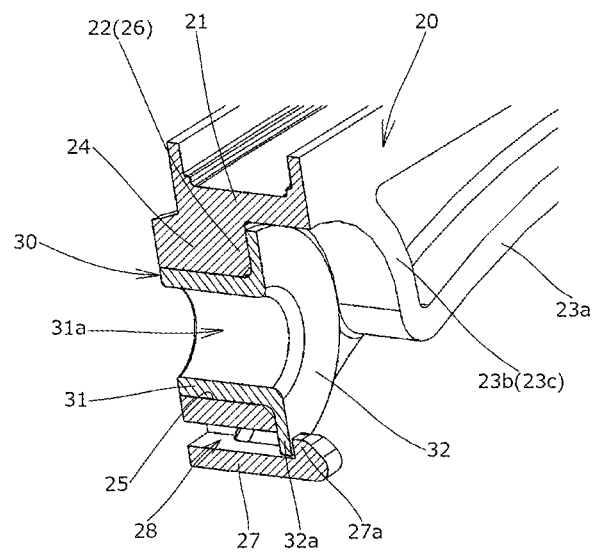
FIG. 7 is an illustrative diagram showing the vicinity of the bushing structure in cross section.

The shoe support 21 is a part that supports the guide shoe (not shown) attached to the guide body 20 on its upper surface, protruding outward in the guide width direction more than the support wall 22 on both sides in the guide width direction, as illustrated in FIG. 7 and FIG. 8.

The support wall 22 is a flat plate part formed to extend downward from the lower surface of the shoe support 21 perpendicularly to the guide width direction, as illustrated in FIG. 2 and FIG. 7.

The reinforcing ribs 23 include, as illustrated in FIG. 2 and FIG. 4, a bottom rib 23a formed along (part of) the lower edge of the support wall 22, and a connecting rib 23b that connects the shoe support 21 and the bottom rib 23a in the guide height direction.

Some of the connecting ribs 23b function as a peripheral rib 23c surrounding a part of the region on the outer circumference of a flange part 32, with the bushing member 30 attached to the guide body 20, as illustrated in FIG. 3 and FIG. 4.

Figure 6:
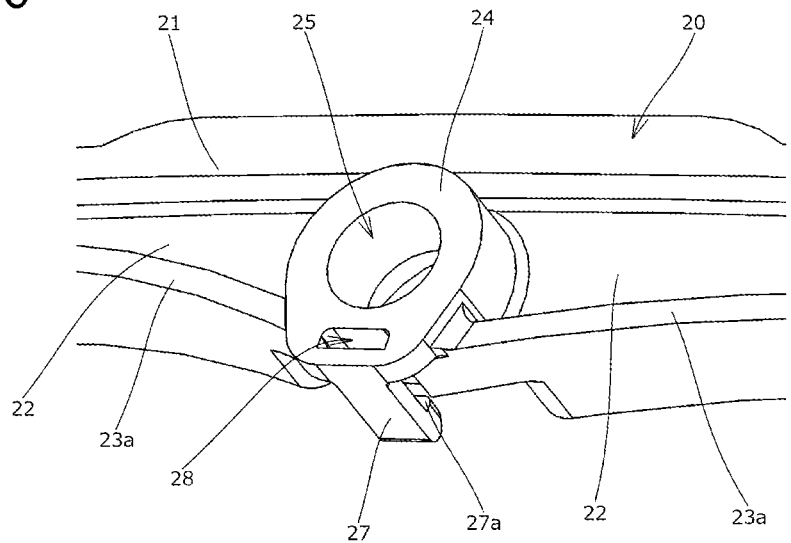
FIG. 6 is an illustrative diagram showing a state after the bushing member has been removed viewed from the opposite side.

The backside boss 24 is a part formed on the back side in the guide width direction of the support wall 22 as illustrated in FIG. 6. In this embodiment, the back side boss protrudes from the support wall 22 and the reinforcing rib 23 (bottom rib 23a) toward the back side in the guide width direction.

The cylindrical insertion hole 25 is formed to extend through the guide body 20 in the guide width direction as illustrated in FIG. 4 and FIG. 6. In this embodiment, the cylindrical insertion hole extends through the support wall 22 and the backside boss 24 in the guide width direction.

The backside restricting part 26 is positioned on the back side in the guide width direction of the flange part 32, with the bushing member 30 attached to the guide body 20, as illustrated in FIG. 4 and FIG. 7, to restrict movement of the flange part 32 toward the back side in the guide width direction. In this embodiment, part of the support wall 22 functions as the backside restricting part 26.

Figure 5:
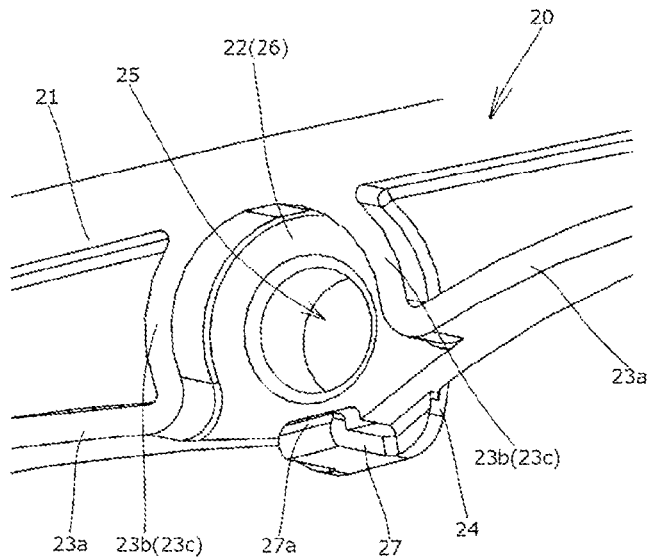
FIG. 5 is an illustrative diagram showing a state after the bushing member has been removed.

The extended part 27 is formed to extend from part of the guide body 20 from the back side to the front side in the guide width direction as illustrated in FIG. 5 and FIG. 6. In this embodiment, the extended part is formed to extend from a lower end of the backside boss 24 toward the front side in the guide width direction, passing below the guide body 20 (support wall 22 and bottom rib 23a).

The extended part 27 is located a predetermined distance below from the guide body 20 (support wall 22 and bottom rib 23a) and is flexible so that it can move closer to and away from the center of the cylindrical insertion hole 25 (in the guide height direction in this embodiment).

The guide body 20 includes, in each bushing structure 40, a front-side restricting portion 27a, which is positioned on and engages with the front side in the width direction of the flange part 32, only in one location on the outer circumference of the cylindrical insertion hole 25 when viewed in the guide width direction as illustrated in FIG. 3, to restrict movement of the flange part 32 toward the front side in the guide width direction.

In other words, with only one front-side restricting portion 27a provided for each bushing structure 40, the chain guide 10 is provided with a total of two front-side restricting portions 27a, because the bushing structure 40 is provided in two locations in this embodiment.

In this embodiment, as illustrated in FIG. 4, the front-side restricting portion 27a is formed in a protruded shape at the distal end on the front side of the extended part 27 such as to protrude toward the center of the cylindrical insertion hole 25 (in this embodiment, upward).

As illustrated in FIG. 4, the front-side restricting portion 27a has a slope on the side facing the center of the cylindrical insertion hole 25 (in this embodiment, upward) inclined to come closer to the center of the cylindrical insertion hole 25 (in this embodiment, upward) toward the back side in the guide width direction.

The front-side restricting portion 27a (i.e., extended part 27) is positioned below the cylindrical insertion hole 25 in the guide height direction as illustrated in FIG. 4.

The guide through hole 28 is a part coinciding with the front-side restricting portion 27a when viewed in the guide width direction as illustrated in FIG. 4, FIG. 6, and FIG. 7, i.e., opens through the guide body 20 in the guide width direction above the extended part 27 (on the side closer to the center of the cylindrical insertion hole 25).

Put differently, the guide through hole 28 is formed to allow the entirety of the front-side restricting portion 27a in a protruded shape to be visible therethrough when viewed from the back side in the guide width direction.

In this embodiment, a hole that extends through the backside boss 24 in the guide width direction, and a groove that extends through in the guide width direction at the lower edge of the support wall 22 and the bottom rib 23a together form the guide through hole 28.

The bushing member 30 is made of metal such as iron, and includes, as illustrated in FIG. 4, at one end of the bushing cylindrical part 31 a cylindrical bushing cylindrical part 31, and the annular plate-like flange part 32 extending radially outward from the bushing cylindrical part 31.

The bushing cylindrical part 31 is partly located inside the cylindrical insertion hole 25 as illustrated in FIG. 7 and FIG. 8, and includes a bolt passage hole 31a for (the shaft part of) a mounting bolt B to pass through.

Part of the outer circumference of the flange part 32 functions as a flange restricted portion 32a where the flange is restricted by the front-side restricting portion 27a from moving toward the front side in the guide width direction, with the bushing member 30 attached to the guide body 20, as illustrated in FIG. 3 and FIG. 7.

The flange part 32 is surrounded by the shoe support 21 and the peripheral rib 23c except for a lower part in the guide height direction, with the bushing member 30 attached to the guide body 20, as illustrated in FIG. 3. In other words, the bottom rib 23a is not formed below the flange part 32.

Further, as illustrated in FIG. 7 and FIG. 8, with the bushing member 30 attached to the guide body 20, the flange part 32 is located further inside in the guide width direction than the peripheral rib 23c in the guide width direction (its outer edge in the guide width direction).

In the first embodiment described above, as can be seen from FIG. 3 and FIG. 4, when attaching the bushing member 30 to the guide body 20, the flange part 32 of the bushing member 30 approaching the guide body 20 pushes the extended part 27 formed with the front-side restricting portion 27a away from the center of the cylindrical insertion hole 25 (downward in the guide height direction), flexing and moving it away, while the bushing cylindrical part 31 of the bushing member 30 enters the cylindrical insertion hole 25 of the guide body 20 toward the back side in the guide width direction.

The chain guide 10 is set, with its back side in the guide width direction of the guide body 20 facing the engine block E that is the mounting target, and the bushing cylindrical part 31 of the bushing member 30 abutting on the engine block E as illustrated in FIG. 8. The mounting bolt B inserted into the bolt passage hole 31a of the bushing member 30 secures the chain guide to the engine block E. When this chain guide 10 is secured to the engine block E, the head part of the mounting bolt B comes into contact with the flange part 32, as illustrated in FIG. 8.

Next, the chain guide 10 according to a second embodiment of the present invention will be described with reference to FIG. 9 to FIG. 12. The second embodiment is configured the same as the first embodiment except for some parts, and therefore description of the configuration other than the different parts will be omitted.

In the first embodiment described above, as illustrated in FIG. 4 and others, the flange part 32 of the bushing member 30 is in an annular plate-like shape (circular plate with a hole in the center). In the second embodiment, part of the annular plate of the flange part 32 is cut off, as illustrated in FIG. 9 and FIG. 10.

Figure 9:
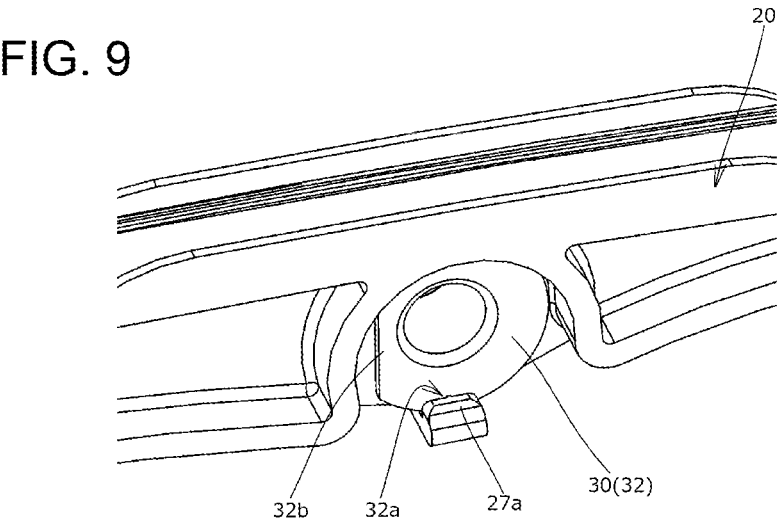
FIG. 9 is an illustrative diagram showing the vicinity of the bushing structure in a second embodiment.
Figure 10:
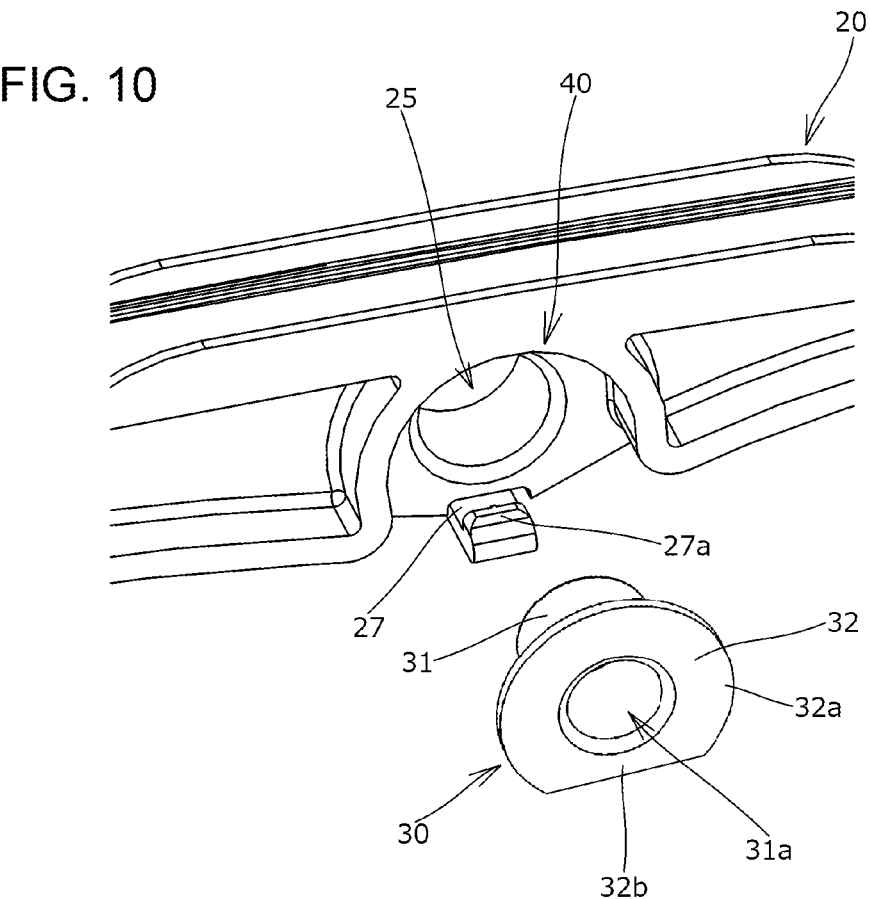
FIG. 10 is an illustrative diagram showing the bushing member separately.

The flange part 32 of the second embodiment includes, as illustrated in FIG. 9 and FIG. 10, a flange restricted portion 32a where the flange part is restricted by the front-side restricting portion 27a from moving toward the front side in the guide width direction, and a flange small radius portion 32b that is smaller than the flange restricted portion 32a in radius from the center of the bushing cylindrical part 31 to the outer edge of the flange part 32.

In the second embodiment described above, when attaching the bushing member 30 to the guide body 20, the front-side restricting portion 27a of the guide body 20 is matched in circumferential position with the flange small radius portion 32b of the flange part 32 as illustrated in FIG. 10, and the bushing cylindrical part 31 of the bushing member 30 is inserted into the cylindrical insertion hole 25 of the guide body 20 toward the back side in the guide width direction. At this time, the extended part 27 need not be flexed to move away the front-side restricting portion 27a because the flange part 32 (flange small radius portion 32b) is formed in a shape that does not interfere with the front-side restricting portion 27a.

After that, the bushing member 30 is rotated around the bushing cylindrical part 31 to the state shown in FIG. 9, bringing the front-side restricting portion 27a of the guide body 20 to a matching circumferential position with the flange restricted portion 32a of the bushing member 30, so that the front-side restricting portion 27a restricts movement of the flange part 32 toward the front side in the guide width direction.

Figure 11:
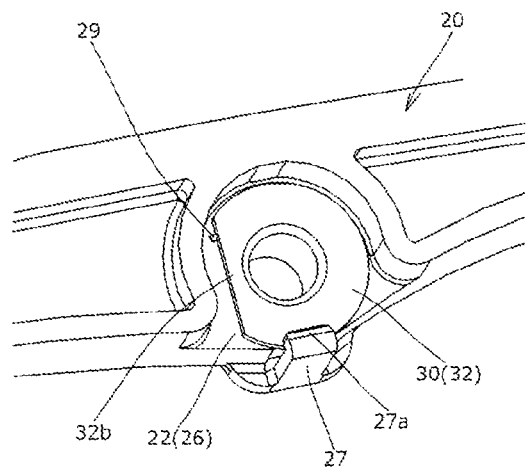
FIG. 11 is an illustrative diagram showing a variation example of the second embodiment.
Figure 12:
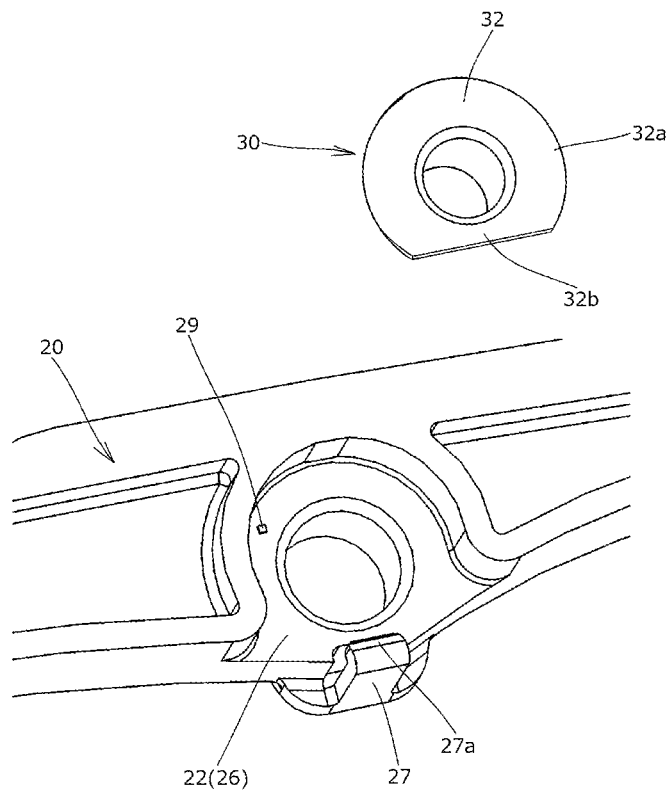
FIG. 12 is an illustrative diagram showing the bushing member separately.

As a variation example of this second embodiment, a rotation restricting part 29 may be provided to the guide body 20 as illustrated in FIG. 11 and FIG. 12, for restricting rotation of the flange part 32 (around the center of the bushing cylindrical part 31), in the state in which the front-side restricting portion 27a is restricting movement of the flange restricted portion 32a toward the front side in the guide width direction. In the example illustrated in FIG. 11 and FIG. 12, the rotation restricting part 29 is provided as a boss on a side face in the guide width direction of the support wall 22. The rotation restricting part 29 is positioned to face an outer edge of the flange small radius portion 32b when the bushing member 30 is attached to the guide body 20.

Next, the chain guide 10 according to a third embodiment of the present invention will be described with reference to FIG. 13 to FIG. 16. The third embodiment is configured the same as the first embodiment except for some parts, and therefore description of the configuration other than the different parts will be omitted.

In the first embodiment described above, as illustrated in FIG. 4, the front-side restricting portion 27a (i.e., the extended part 27) of the guide body 20 is located below the cylindrical insertion hole 25 in the guide height direction. In the third embodiment, as illustrated in FIG. 13 to FIG. 16, the front-side restricting portion 27a (i.e., the extended part 27) is located above the cylindrical insertion hole 25 in the guide height direction.

Figure 13:
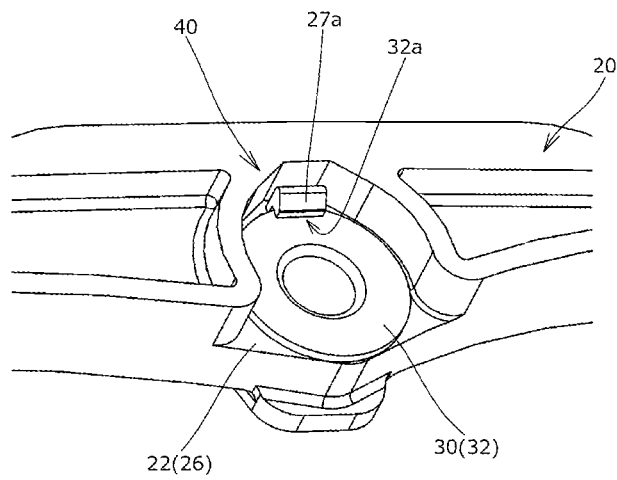
FIG. 13 is an illustrative diagram showing the vicinity of the bushing structure in a third embodiment.
Figure 14:
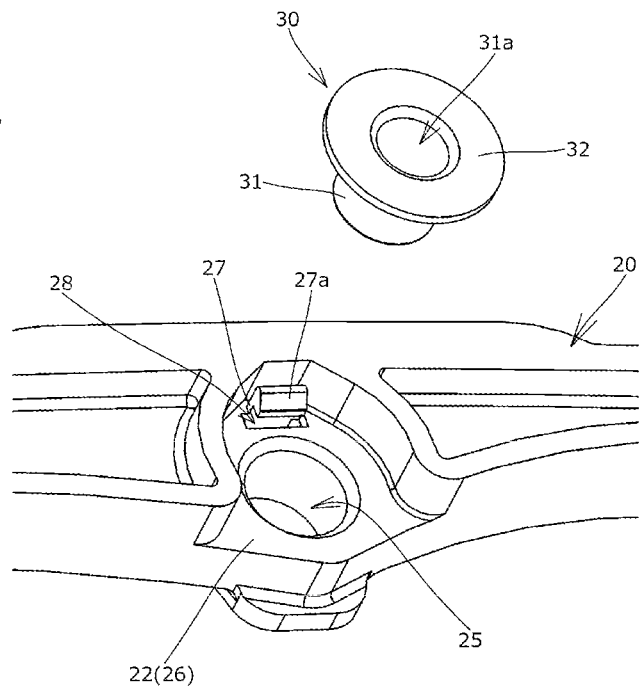
FIG. 14 is an illustrative diagram showing the bushing member separately.
Figure 15:
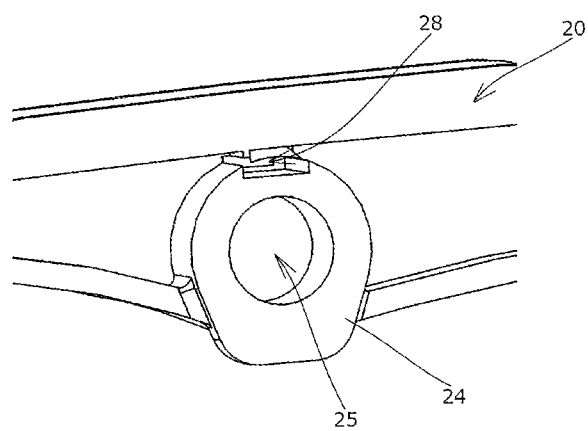
FIG. 15 is an illustrative diagram showing a state after the bushing member has been removed viewed from the opposite side.
Figure 16:
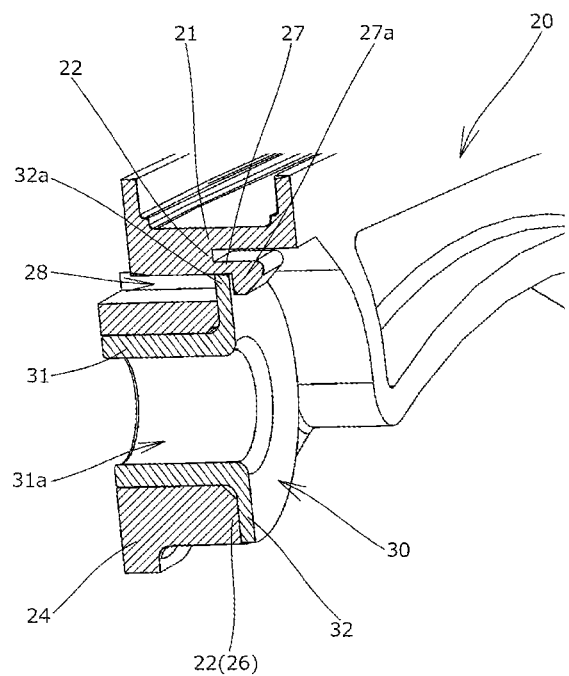
FIG. 16 is an illustrative diagram showing the vicinity of the bushing structure in cross section.

Specifically, in the third embodiment, the extended part 27 is formed to protrude from a side face of the support wall 22 toward the front side in the guide width direction in a location above the cylindrical insertion hole 25 in the guide height direction as illustrated in FIG. 13 and FIG. 14.

The front-side restricting portion 27a is formed in a protruded shape at the distal end on the front side of the extended part 27 such as to protrude toward the center of the cylindrical insertion hole 25 (in this embodiment, downward).

In the third embodiment, as illustrated in FIG. 13 and FIG. 14, the guide through hole 28 is also formed above the cylindrical insertion hole 25, specifically in a position coinciding with the front-side restricting portion 27a when viewed in the guide width direction, in other words, opens through the guide body 20 in the guide width direction below the extended part 27 (on the side closer to the center of the cylindrical insertion hole 25).

Specific locations of the front-side restricting portion 27a (and the extended part 27) and the guide through hole 28 of the guide body 20 are not limited to the position below the cylindrical insertion hole 25 as in the first embodiment or the position above the cylindrical insertion hole 25 as in the third embodiment and may be set anywhere on the outer circumference of the cylindrical insertion hole 25.

While embodiments of the present invention have been described in detail, the present invention is not limited to the above-described embodiments and may be carried out with various design changes without departing from the scope of the present invention set forth in the claims.

For example, various features of the embodiments and variation examples described above may be combined as desired to configure another chain guide 10.

While the chain guide 10 is provided inside an engine that has a timing system in the embodiments described above, the chain guide is applicable not only to this but to various equipment.

The chain guide 10 is applicable in various industrial fields including similar drive mechanisms using not only chains CH, but also belts, ropes and the like.

Unlike the embodiments described above in which the guide shoe (not shown) and the guide body 20 are separately provided and the guide shoe (not shown) is attached to the guide body 20, the guide shoe (not shown) may be integrally formed to the guide body 20.

Further, the materials for the guide body 20 and the guide shoe (not shown) may be selected from known suitable materials in accordance with various conditions such as elasticity, friction resistance, rigidity, durability, formability, cost, and so on. Synthetic resin materials are particularly suitable.

The material for the bushing member 30 may be selected from known suitable metal materials in accordance with various conditions such as rigidity, durability, formability, cost, and so on. Preferably, the bushing member 30 should be made of the same metal material as the mounting bolt B.

In the embodiments described above, as illustrated in FIG. 2, the chain guide 10 includes the bushing structure 40 where the bushing member 30 is attached to the guide body 20 in two locations spaced apart in the guide longitudinal direction. The bushing structure 40 may be provided in one or more locations, and the number of bushing structure is not limited to two. Reference numeral 25a in FIG. 2 denotes bolt holes formed to extend through the guide body 20 in the guide width direction for mounting bolts B to pass through. In FIG. 2, of the bushing structures 40 in two locations, the bushing structure 40 on the left side is shown without the bushing member 30.

In the embodiments described above, the chain guide 10 is configured as a fixed guide that is fixedly attached to the engine block E. Instead, the chain guide 10 may be configured as a pivotable guide G axially supported such as to be pivotable inside the engine room. When configured as a pivotable guide G, the chain guide 10 need only be provided with one bushing structure 40 where a bushing member 30 is attached to the guide body 20, the bushing member having a bolt passage hole 31a for a mounting shaft (pivot shaft) to be inserted.

What is claimed is:

1. A chain guide comprising: a guide body having a shoe support for supporting a guide shoe that slidably guides a running chain on an upper side in a guide height direction; and a bushing structure at least in one location where a bushing member is attached to the guide body, the bushing member including a bushing cylindrical part formed with a bolt passage hole, and a flange part extending radially outward from the bushing cylindrical part at one end of the bushing cylindrical part, the guide body including a cylindrical insertion hole formed to extend therethrough in a guide width direction so that the bushing cylindrical part is inserted from a front side to a back side in the guide width direction, and a backside restricting part that restricts movement of the flange part toward the back side in the guide width direction, the guide body including, in each bushing structure, a front-side restricting portion that is positioned on the front side in the guide width direction of the flange part and restricts movement of the flange part to the front side in the guide width direction only in one location on an outer circumference of the cylindrical insertion hole when viewed in the guide width direction, wherein the guide body includes an extended part extending from a portion of the guide body from the back side to the front side in the guide width direction, and a distal end on the front side of the extended part is formed with the front-side restricting portion.

2. The chain guide according to claim 1, wherein the extended part is flexible and formed to be movable in directions in which the extended part moves closer to and away from a center of the cylindrical insertion hole.

3. The chain guide according to claim 1, wherein the front-side restricting portion is positioned below the cylindrical insertion hole in the guide height direction.

4. The chain guide according to claim 1, wherein the guide body includes a support wall that supports the shoe support from below, and a reinforcing rib protruding from a side face of the support wall in the guide width direction, and the reinforcing rib includes a peripheral rib formed to surround an outer circumference of the flange part, with the bushing member being attached to the guide body.

5. A chain guide comprising: a guide body having a shoe support for supporting a guide shoe that slidably guides a running chain on an upper side in a guide height direction; and a bushing structure at least in one location where a bushing member is attached to the guide body, the bushing member including a bushing cylindrical part formed with a bolt passage hole, and a flange part extending radially outward from the bushing cylindrical part at one end of the bushing cylindrical part, the guide body including a cylindrical insertion hole formed to extend therethrough in a guide width direction so that the bushing cylindrical part is inserted from a front side to a back side in the guide width direction, and a backside restricting part that restricts movement of the flange part toward the back side in the guide width direction, the guide body including, in each bushing structure, a front-side restricting portion that is positioned on the front side in the guide width direction of the flange part and restricts movement of the flange part to the front side in the guide width direction only in one location on an outer circumference of the cylindrical insertion hole when viewed in the guide width direction, wherein the guide body includes a support wall that supports the shoe support from below, and a backside boss formed on the back side in the guide width direction of the support wall, the cylindrical insertion hole is formed to extend through the support wall and the backside boss in the guide width direction, the guide body includes an extended part extending from the backside boss to the front side in the guide width direction, and a distal end on the front side of the extended part is formed with the front-side restricting portion.

6. A chain guide comprising: a guide body having a shoe support for supporting a guide shoe that slidably guides a running chain on an upper side in a guide height direction; and a bushing structure at least in one location where a bushing member is attached to the guide body, the bushing member including a bushing cylindrical part formed with a bolt passage hole, and a flange part extending radially outward from the bushing cylindrical part at one end of the bushing cylindrical part, the guide body including a cylindrical insertion hole formed to extend therethrough in a guide width direction so that the bushing cylindrical part is inserted from a front side to a back side in the guide width direction, and a backside restricting part that restricts movement of the flange part toward the back side in the guide width direction, the guide body including, in each bushing structure, a front-side restricting portion that is positioned on the front side in the guide width direction of the flange part and restricts movement of the flange part to the front side in the guide width direction only in one location on an outer circumference of the cylindrical insertion hole when viewed in the guide width direction, wherein the guide body is made of a synthetic resin, the guide body includes an extended part extending from a portion of the guide body from the back side to the front side in the guide width direction, a distal end on the front side of the extended part is formed with the front-side restricting portion in a protruded shape so as to protrude toward a center of the cylindrical insertion hole, and the guide body includes a guide through hole extending therethrough in the guide width direction at a position coinciding with the front-side restricting portion when viewed in the guide width direction.

7. A chain guide comprising: a guide body having a shoe support for supporting a guide shoe that slidably guides a running chain on an upper side in a guide height direction; and a bushing structure at least in one location where a bushing member is attached to the guide body, the bushing member including a bushing cylindrical part formed with a bolt passage hole, and a flange part extending radially outward from the bushing cylindrical part at one end of the bushing cylindrical part, the guide body including a cylindrical insertion hole formed to extend therethrough in a guide width direction so that the bushing cylindrical part is inserted from a front side to a back side in the guide width direction, and a backside restricting part that restricts movement of the flange part toward the back side in the guide width direction, the guide body including, in each bushing structure, a front-side restricting portion that is positioned on the front side in the guide width direction of the flange part and restricts movement of the flange part to the front side in the guide width direction only in one location on an outer circumference of the cylindrical insertion hole when viewed in the guide width direction, wherein the flange part includes a flange restricted portion where the flange part is restricted by the front-side restricting portion from moving to the front side in the guide width direction, and a flange small radius portion that is smaller than the flange restricted portion in terms of radius thereof from a center of the bushing cylindrical part to an outer edge of the flange part.

8. The chain guide according to claim 7, wherein the guide body includes a rotation restricting part that restricts rotation of the flange part in a state in which the front-side restricting portion restricts movement of the flange restricted portion to the front side in the guide width direction.

* * * * *